(12) United States Patent
Yelvington et al.

(10) Patent No.: US 8,603,337 B1
(45) Date of Patent: Dec. 10, 2013

(54) LIGHTWEIGHT DEVICE FOR HEATING AND PURIFYING WATER

(75) Inventors: Paul E. Yelvington, Rockledge, FL (US); Robert A. Damitz, Satellite Beach, FL (US); Samantha J. Roman, Jacksonville, FL (US); Ian T. McCarrell, Green Bay, WI (US)

(73) Assignee: Mainstream Engineering Corporation, Rockledge, FL (US)

( * ) Notice: Subject to any disclaimer, the term of this patent is extended or adjusted under 35 U.S.C. 154(b) by 337 days.

(21) Appl. No.: 12/908,895

(22) Filed: Oct. 21, 2010

(51) Int. Cl.
*B01D 61/00* (2006.01)
*A47J 27/62* (2006.01)

(52) U.S. Cl.
USPC ........ 210/261; 210/257.2; 210/295; 426/108; 426/109

(58) Field of Classification Search
USPC .......... 426/109, 113, 108, 132, 106; 210/261, 210/257.2, 295; 126/373, 369, 369.1, 126/263.05; 206/222; 62/4, 6; 222/1, 386.5, 222/399; 604/141, 145
See application file for complete search history.

(56) References Cited

U.S. PATENT DOCUMENTS

| | | |
|---|---|---|
| 3,079,911 A | 3/1963 | Ryan et al. |
| 4,522,190 A | 6/1985 | Kuhn et al. |
| 4,559,921 A | 12/1985 | Benmussa |
| 4,751,119 A | 6/1988 | Yukawa |
| 4,753,085 A * | 6/1988 | Labrousse ............ 62/294 |
| 4,762,113 A | 8/1988 | Hamasaki |
| 4,809,673 A | 3/1989 | Charvin |
| 4,819,612 A | 4/1989 | Okamoto et al. |
| 4,895,135 A | 1/1990 | Hamasaki |
| 5,117,809 A | 6/1992 | Scaringe et al. |
| 5,205,277 A | 4/1993 | Chao-Tsung |
| 5,355,869 A | 10/1994 | Pickard et al. |
| 5,390,659 A | 2/1995 | Scaringe et al. |
| 5,465,707 A | 11/1995 | Fulcher et al. |
| 5,487,833 A | 1/1996 | Fife et al. |
| 5,517,981 A | 5/1996 | Taub et al. |
| 5,553,741 A * | 9/1996 | Sancoff et al. ............ 222/1 |
| 5,558,762 A | 9/1996 | Fife et al. |

(Continued)

FOREIGN PATENT DOCUMENTS

| | | |
|---|---|---|
| WO | 9411682 A1 | 5/1994 |
| WO | 2007084012 A1 | 7/2007 |

OTHER PUBLICATIONS

"Water Disinfection for International and Wilderness Travelers", Howard Backer, Travel Medicine, CID 2002:34 (Feb. 1), pp. 355-364.

(Continued)

*Primary Examiner* — Jianying Atkisson

(57) ABSTRACT

A water heater and purifier has a membrane element and employs an exothermic and pressure-generating chemical reaction. The exothermic reaction heats water, and the gaseous reaction products pressurize an enclosure and force water through a membrane filter for purification. Disinfection of the water is achieved using heat, filtration, and optionally a chemical disinfectant.

26 Claims, 8 Drawing Sheets

(56) References Cited

U.S. PATENT DOCUMENTS

| | | |
|---|---|---|
| 5,611,329 A | 3/1997 | Lamensdorf |
| 6,010,626 A | 1/2000 | D'Agostino |
| 6,248,257 B1 | 6/2001 | Bell et al. |
| 6,267,110 B1 | 7/2001 | Tenenboum et al. |
| 6,289,889 B1 * | 9/2001 | Bell et al. .................. 126/263.07 |
| 6,341,602 B1 * | 1/2002 | Fulcher .................... 126/263.07 |
| 6,644,383 B2 | 11/2003 | Joseph et al. |
| 7,390,343 B2 | 6/2008 | Tepper et al. |
| 7,473,362 B1 * | 1/2009 | Nohren, Jr. ............... 210/321.64 |
| 7,709,035 B2 | 5/2010 | Richardson et al. |
| 2010/0300969 A1 * | 12/2010 | Back et al. .................... 210/638 |

OTHER PUBLICATIONS

"Mechanism of Dihydrogen Formation in the Magnesium—Water Reaction", Irwin A. Taub et al, J. Phys. Chem. A 2002, 106, pp. 8070-8078.

* cited by examiner

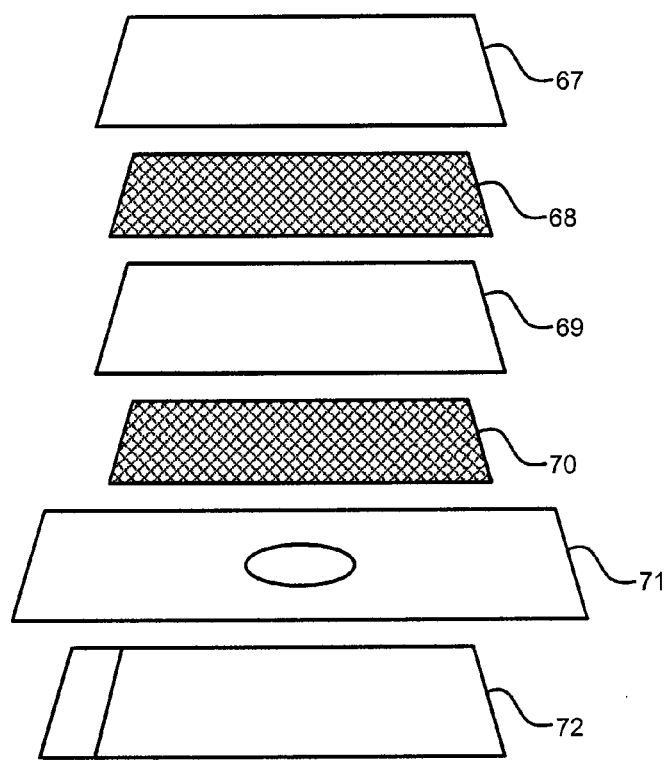
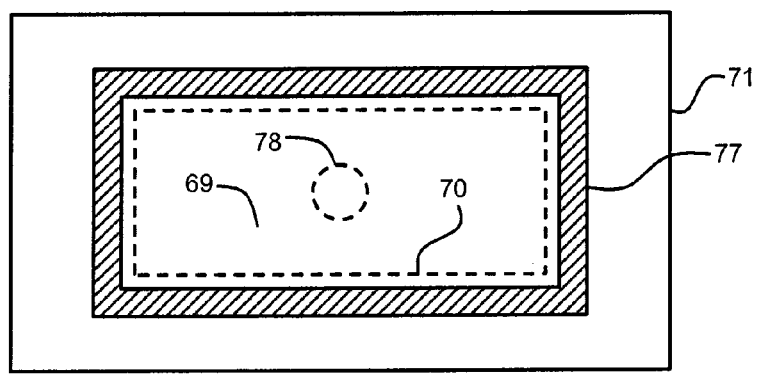

LIGHTWEIGHT DEVICE FOR HEATING AND PURIFYING WATER

FEDERALLY SPONSORED RESEARCH OR DEVELOPMENT

This invention was made with Government support under contract W911QY-07-C-0115 awarded by the U.S. Army RDECOM, Natick Contracting Division. The Government has certain rights in the invention.

BACKGROUND AND SUMMARY OF THE INVENTION

Dehydrated and freeze-dried foods offer excellent shelf-life, good nutritional content, and are very lightweight compared to hydrated foods. These qualities have made dehydrated and freeze-dried foods popular for wilderness backpacking and long-range military operations. Reducing pack weight is very important when carrying equipment in a backpack. It is not uncommon for recreational wilderness backpackers to count every ounce that goes into their packs. Similarly, military packs have become extremely heavy, typically weighing 70 to 90 lbs. In an effort to trim pack weight, Army Special Operations and Marine Corps soldiers carry a freeze-dried ration called the Meal Cold Weather/Long Range Patrol (MCW/LRP). The MCW/LRP can reduce pack weight by a crucial 5 lbs for a 10-day patrol when compared to the conventional Meal, Ready-to-Eat (MRE) ration. However, the use of freeze-dried foods in the wilderness requires a source of clean, hot water. Carrying the water along with the freeze-dried meals negates the weight savings and defeats a main purpose of using these meals.

The current method for water disinfection in the field used by the military is the addition of a chemical disinfectant to the water. This disinfectant is typically either iodine or chlorine plus a flocculating agent. The flocculating agent requires doing a coarse filtration through a cotton cloth. Recreational backpackers also often use chemical disinfectants. The self-heating water purifier and food heating and hydrating invention (also referred to as SHWP) described hereinafter uses three methods for disinfection: heat disinfection, membrane filtration, and chemical disinfection.

In addition to chemical disinfectants, backpackers often use membrane filters or purifiers. These personal water filters require hand pumping, which can be time consuming. Hand-pump water filters also add considerable weight (approx. 1 lb).

Heating of water or food in the wilderness presents another challenge. Wilderness backpackers often use camp stoves fueled by liquid fuels like white gas. These commercial stoves are also used by soldiers. In addition, soldiers use stoves that use other fuel sources such as flammable gels (e.g., pyropac) and bars (e.g., trioxane). The stove must be set up on a flat, stable surface that is out-of-doors. There are a number of drawbacks to camp stoves. First, they require the carrying of a stove, fuel, and pot which can contribute significant weight (1 to 2 lbs). Second, camp stoves often cannot be used in heavy rains or strong winds. Third, because of toxic fumes and fire concerns, camp stoves can only be used outside. Fourth, camp stoves cannot be used while on the move, either hiking on foot or in a vehicle. The stove presents an additional drawback for military use in that the flame causes a visible and thermal signature that hampers soldier stealth. The SHWP uses a flameless chemical heater and therefore eliminates the need for an open flame and the associated problems. The SHWP can heat water and food while on-the-go (either on foot or in a vehicle), in enclosed spaces (like a tent), in any weather conditions including wind and rain, and without a thermal or visible signature. Also, a disposable version of the SHWP weighs only 3 oz. and therefore offers significant weight savings over the camp stove and hand-pump water purifier it replaces.

The SHWP is also a very flexible device that allows several different specific hardware embodiments and uses. For example, the SHWP can also be used simply to heat water when purification is not required. Also, the SHWP can be used to purify only when cool potable water is desired for drinking. In addition, the SHWP can be used to heat prepared meals, like the MRE, while also heating and purifying water to prepare a hot beverage to accompany the meal or simply to heat a meal and produce hot water for other uses, such as personal hygiene (e.g., shaving). Both flexible, disposable and rigid, reusable embodiments of the SHWP are anticipated.

Flameless chemical heaters are generally well known in the prior art. One such known device is a flameless ration heater (FRH) that uses the exothermic reaction of a supercorroding magnesium/iron (Mg/Fe) alloy with aqueous sodium chloride. These devices use the chemical reaction to provide heat to warm a food or beverage, and any gaseous byproducts of the reaction are vented to the ambient. Mainstream Engineering Corporation of Rockledge, Fla., has also used a chemical reaction to provide a pressure source in addition to heat.

The Mg/Fe-water reaction is the preferred exothermic and pressure-generating chemical reaction for the present invention. The stoichiometry of the reaction is shown below.

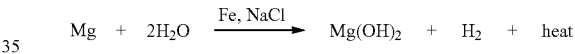

$$Mg + 2H_2O \xrightarrow{Fe, NaCl} Mg(OH)_2 + H_2 + heat$$

The magnesium reacts with water to produce magnesium hydroxide, $Mg(OH)_2$, and hydrogen gas, $H_2$. The hydrogen bubbles to the surface while the magnesium hydroxide forms a milky white solution with water and eventually starts precipitating out as the reaction progresses and the solubility with water is exceeded. The reaction is exothermic and produces a significant amount of heat. The reaction is catalyzed by the addition of iron (Fe), which is mechanically alloyed with the magnesium, and sodium chloride (NaCl), which dissolves in the water. The Mg/Fe powder is a commercially available product.

This known chemistry and its use to heat food and water is described in various patents. U.S. Pat. No. 4,522,190 describes the original FRH that used the Mg/Fe powder in a porous sintered plastic sheet. U.S. Pat. No. 5,117,809 discusses an improvement to the FRH reaction that uses the Mg/Fe powder directly rather with the polymer matrix. U.S. Pat. No. 5,611,329 discusses the use of the Mg/Fe powder in a flexible, porous pouch, an approach currently used by the U.S. military for heating MREs. U.S. Pat. No. 5,517,981 describes the use of alternative salts to change the quantity of hydrogen gas produced. U.S. Pat. No. 6,248,257 describes other exothermic chemistries that can be used for heating. None of the prior art sought, however, to harness and use the pressure generated by the reaction.

Hand-pumped, personal water purifiers are also generally well known in the prior art. Possible types of microbial contamination in water are viruses (e.g., norovirus, rotovirus), bacteria (e.g., salmonella, e. coli), and cysts (e.g., giardia, crytosporidium). Most membranes remove microbes by filtering based on size. Water molecules are smaller than the microbes so water passes through the membrane while the microbes are retained. Of the microbes, viruses are the smallest and thus the hardest to remove. While viruses are not typically found in bodies of water in the United States, they are found in other developing countries. Membrane filters that can remove viruses are referred to as purifiers, while membranes that are only effective against bacteria and cysts are referred to as filters.

U.S. Pat. Nos. 5,558,762 and 6,010,626 describe handpumped water filters that use ceramic or similar filters to remove bacteria and cysts. U.S. Pat. No. 7,438,801 describes a hand-pumped water purifier for reverse osmosis that removes salt and other contaminants.

Several types of membranes are available for water filtration and purification. Nanofilters have very small pore sizes and are capable of removing viruses. Ultrafilters have larger pores and effective against bacteria and cysts but not viruses. Microfilters have still larger pores and are often used as prefilters to catch plant material and other large contaminants before they contact a finer pore-size filter. Reverse osmosis membranes have very small pores capable of removing salt (NaCl) from saline water sources. Typically, as the pore size is decreased, more pressure is required to push water through the membrane at the same flow rate. Electroadsorptive membranes (see, e.g., U.S. Pat. No. 7,390,343) are a new class of materials that filter based on electrostatic attraction and size. These materials are capable of removing viruses and generally have the filtration performance of a nanofilter with the flow rate of a microfilter.

Mainstream Engineering Corporation of Rockledge, Fla., has previously developed a self-heating, self-hydrating device that also uses the chemical reaction to produce both heat and pressure. Pressure is used to force water through a filtration membrane for purification, and a bladder is relied upon to expand and pressurize the water being forced through the filter.

U.S. Pat. No. 7,709,035 describes a device that combines a chemical heater and membrane filter to heat and purify water for reconstituting freeze-dried foods and beverages. The Mg/Fe heater chemicals are mixed directly with the raw water, and this mixture is then filtered by the membrane. However, this configuration introduces practical problems because the heater chemicals and the magnesium hydroxide byproduct will foul the membrane.

Of the many examples of chemical heaters, hand-pumped water filters, and membranes in the prior art; the present invention improves upon them by combining the heating and purification functions and eliminating the need for a manual hand pump.

An object of this invention is to improve the heating and purification of raw, untreated water of questionable microbial content for the purpose of reconstituting freeze-dried or dehydrated meals or beverages. The function of the invention is to produce potable water at approximately 150° F. (65° C.) from any non-saline water source, including those contaminated with viruses, while optionally also heating a sealed ready-to-eat food pouch.

The present application describes improvements to the above-mentioned Mainstream Engineering Corporation device as described in U.S. patent application Ser. No. 11/767,672. Specifically, a simple passageway instead of an expandable bladder is employed to allow the gaseous products of the reaction to pressurize the water to be treated. In one currently preferred embodiment, the passageway is a simple open pouch that allows gaseous reaction products to flow from the heater section to the raw water section. Removing the bladder has substantial manufacturing and cost advantages and also allows thinner more flexible materials to be used between the heater and raw water sections. It also allows materials with improved heat transfer characteristics to be used. Any issues relating to the bursting of the bladder are also eliminated. These improvements are deemed critical to developing a more cost effective, manufacturable, and lighter device.

This invention involves the use of an apparatus and method to heat and hydrate foods by way of an exothermic and pressure generating chemical reaction. The chemical reaction can be activated by water or other means. For water activation, any water source, ranging from salt water to fresh water can be used. Water is added to a chemical formulation, generating both heat from the exothermic reaction as well as pressure caused by the formation of gaseous products of the reaction. The exothermic heat from the reaction transfers to the raw water and the pressure provides the driving force for membrane filtration (e.g., electroadsorptive, reverse osmosis, nanofiltration, ultrafiltration, and microfiltration). Additional chemical disinfectants can also be optionally used to augment disinfection. The heating and hydrating system can be used in a flexible or rigid container. Specifically, this invention teaches an improved arrangement of the inner and outer sections of the device to segregate the heater chemicals from the raw water in order to allow heating and pressure-driven filtration of the raw water without contaminating it with the heater formulation or its byproducts.

Still one further object of the present invention is to provide a practical way to heat and hydrate dehydrated beverages and foods, and powdered drink mixes, from non-potable water, using an exothermic and pressure generating reaction so as to harness and use the reaction-generated pressure.

Another object of the present invention is to achieve a way of heating pre-packaged foods, such as the military MRE, while also providing purified hot water for an accompanying hot beverage, or for other purposes such as personal hygiene, including shaving.

Yet another object of this invention is to use flexible pouches and/or rigid containers for the heating and hydrating device.

Yet another object of this invention is to keep the chemical formulation separated from the raw water to avoid membrane fouling while allowing the transfer of heat and passage of pressurizing gas without the need for an expandable bladder.

Yet another object of this invention is to allow any reaction which generates heat and pressure to be used in an integrated design to heat and purify non-potable water. Reactions which can generate both heat and pressure can be activated by processes including, but not limited to, water addition, spark, shock, squib, or electrical impulse.

Yet another object of this invention is to use reaction-generated pressure to drive a membrane filtration with potable water fluxes of about at least 4 milliliters per square centimeter per minute.

Yet another object of this invention is to employ chemical compositions that can heat water or food supplies to more than 150° F. (65° C.) in 15 minutes or less.

Yet another object of this invention is to make otherwise non-potable water of questionable microbial origin potable through the removal or inactivation of waterborne bacteria, viruses, and cysts.

A further object of this invention is to be able to use additional chemical disinfectants to augment disinfection of the non-potable water, where the chemical disinfectants can be later removed from the raw water by the membrane so as not to affect the taste.

The SHWP offers flexibility to the user, so certain combinations of one or two of these disinfection methods can also be used, as discussed below. Use of multiple disinfection methods provides maximum redundancy that decreases the chances of device failure. An annoyance with chemical disinfectants such as iodine and chlorine is that they impart a disagreeable taste on the water. The membrane used in a currently preferred embodiment of the SHWP removes the chemical disinfectant after it has killed any microbes present in the raw water and hence does not affect the taste.

The SHWP uses a unique arrangement that uses heat from the reaction to assist in the disinfection, and optionally heat the food or beverage while the reaction generated pressure is used to drive the raw water through the membrane for purification and removal of undesirable chemical tastes, rather than employing manual pumping to create this pressure.

BRIEF DESCRIPTION OF THE DRAWINGS

Other objects, advantages and novel features of the present invention will become apparent from the following detailed description when considered in conjunction with the accompanying drawings herein.

FIG. 4b is a top view of the interior pouch with a common side seal shown in FIG. 4a.

FIG. 5b is a top view of the interior pouch shown in FIG. 5a.

FIG. 6 is an exploded perspective view of the elements that comprise the filtering portion of the flexible pouch of the present invention.

FIG. 7 is a top view showing the arrangement and assembly of the filtering portion of the flexible pouch embodiment of the present invention shown in FIG. 2.

FIG. 8 is a front elevational view of another use of the flexible pouch embodiment of the present invention, with a prepared meal pouch (e.g., a military MRE) inserted into the device to provide heating of the MRE while also heating and purifying water for preparing a hot beverage and the like.

DETAILED DESCRIPTION OF CURRENTLY PREFERRED EMBODIMENTS

Figure 1:
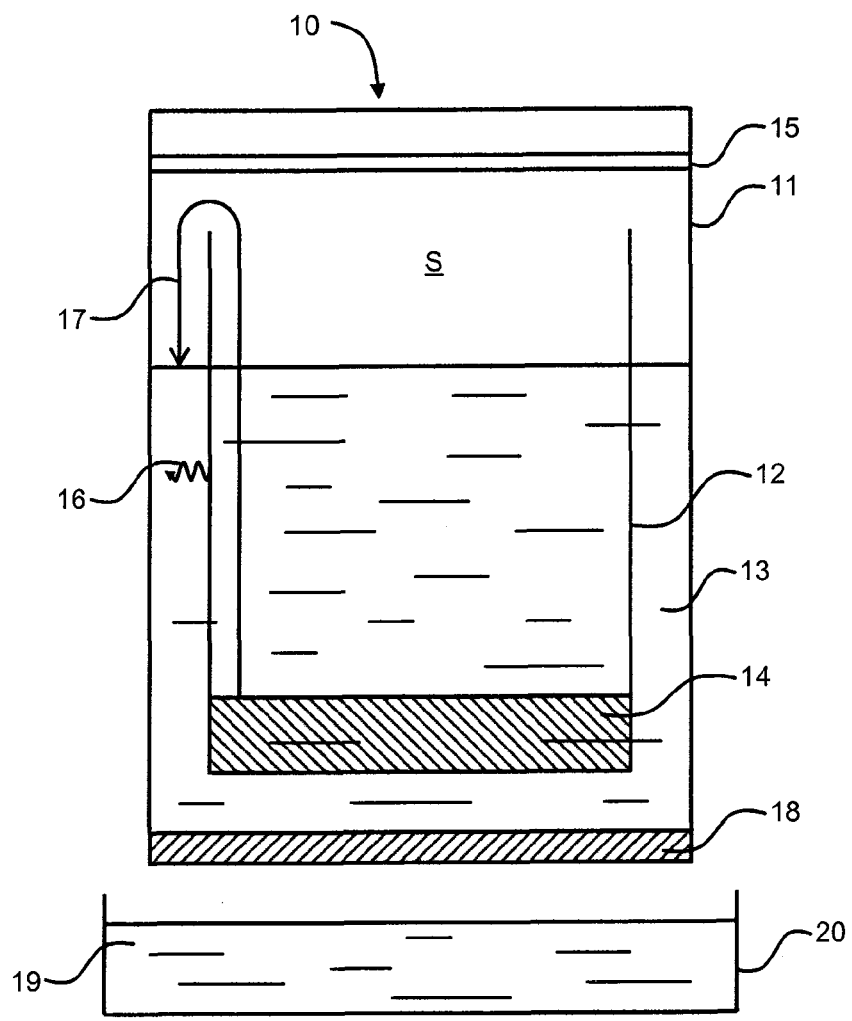
FIG. 1 is a schematic cross-sectional elevational view of an apparatus embodying one embodiment of the present invention to heat and purify water.

Referring now to FIG. 1, the SHWP 10 has an outer container 11 that can be flexible or rigid and an inner container 12 that can also be flexible or rigid. The outer and inner containers 11, 12 can be created by separate walls and seams or by using a combination of a common interior partition and common interior wall as will be understood by one skilled in the art. The general approach is to create an inner container surrounded at least partially by an outer container. In FIG. 1, the inner container 12 is completely separate from the outer container 11.

The volume located between the inner and outer pouches is filled with raw water 13 that the user wishes to purify and/or heat. Prepackaged food to be heated, such as a military MRE (FIG. 8 discussed below), could also be placed in this volume and thereby surrounded by the raw water 13 that is being heated.

A known type of chemical disinfectant, such as iodine or chlorine tablet or powder can also be added to the raw water 13, or located in the outer pouch 11 during manufacture, to provide a redundant and additional method of disinfection. The raw water 13 can potentially contain viruses, bacteria, cysts, organics, turbidity, and organic matter potentially found in untreated field water.

The inner container 12 contains a reactive chemical formulation 14 that produces heat and gaseous products once initiated. The reaction can be initiated several ways. In the embodiment of FIG. 1, the reaction is initiated by the addition of water introduced into the inner pouch or container 12. Water is introduced to both the outer and inner containers 11,12 by opening the outer container closure 15 and pouring water into both containers to the predetermined levels. To avoid the accidental opening and potential degradation of the reactive chemical formulation 14 prior to use, the sealed outer container 11 can be torn open, with the assistance of the tear notch such as that designated by numeral 27 shown in the embodiment of FIG. 2, prior to opening the outer container closure 15. Of course this is only one known way to seal the container prior to its use.

Heat is transferred as schematically shown by the wavy line 16 through the walls of the inner pouch 12 to the raw, unfiltered water 13 residing in the void space between the outer and inner containers 11, 12. Gaseous products 17 of the chemical reaction (hydrogen gas in the case of the Mg/Fe-water reaction) are evolved as bubbles and escape from the inner container 11 and fill the head space S above the chemical formulation 14 and the raw water 13. After the raw water 13 has reached an acceptable temperature, or immediately after the water is added, the outer container 11 is sealed to allow the pressure to build in the outer container 11 as gaseous reaction products are trapped inside. This pressure forces the raw water 13 to flow through a membrane assembly 18 associated with the outer container 11.

The membrane assembly 18 can be directly associated with the outer container 11, such as a flat sheet sealed to the bottom, or a membrane cartridge can be associated to the outer container 11 through a fitting or flexible hose. The membrane assembly 18 includes a membrane, membrane support and optionally prefilter and pre-filter spacer as described below. Hot, potable water 19 is expelled from the membrane assembly 18 and collected in a collector 20, which can contain a freeze-dried or dehydrated food or beverage for the purpose preparing a meal. The hot, clean water can also be used for personal hygiene, shaving, and the like. In a further contemplated embodiment, a treated water collection container 20 can be made integral to the SHWP device.

Prior to the present invention, it had been proposed to employ a flexible bladder to separate the reactive chemical formulation and the raw, unfiltered water. The bladder inflated as the gaseous reaction products were evolved thereby pressurizing the unfiltered water and pushing it through the membrane. Materials requirements (i.e., elasticity, thinness, strength) for a bladder are not easily achieved by typical low-cost, flexible materials. The present invention avoids these materials constraints by using an inner container 12 rather than an expandable bladder. Because gases are free to flow from the inner container 12 to the outer container 11, the container material does not need to be elastic. Likewise, because the pressure is the same on both sides of the inner container walls 12, strength also became much less critical. The present invention allows the use of readily available thin plastic films that are moderately strong and thin so as to minimize the resistance to heat conduction and to provide thermal stability (i.e., sufficiently high glass transition and melting temperatures).

Figure 2:
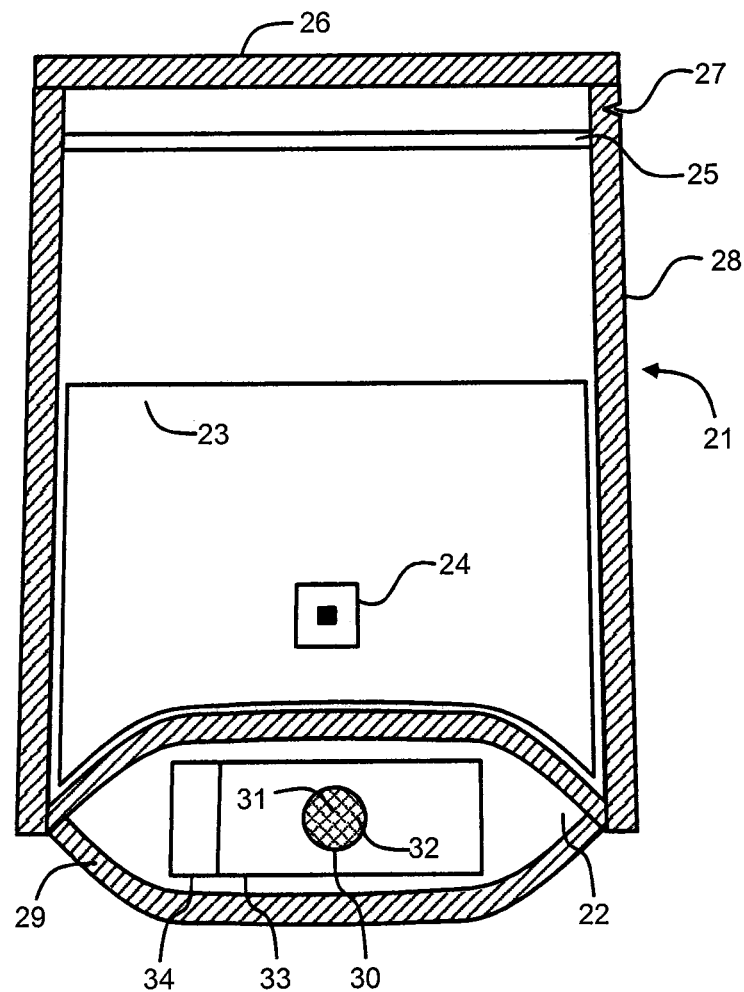
FIG. 2 is a view of the exterior of a flexible pouch embodiment of the present invention with the bottom shown turned up.

FIG. 2 shows yet another preferred embodiment of the invention wherein the inner and outer containers are made of flexible materials. In this embodiment, the outer container is a stand-up gusseted pouch 21 like those used for various grocery items. The gusset 22 allows the pouch 21 to stand stably on its own. The gusseted outer pouch 21 is a generally known manner formed by heat sealing a W-shaped strip of plastic film. The bag can be made from one continuous strip or from separate front, back, and bottom pieces heat sealed along the sides 28 and bottom 29. In our currently preferred embodiment, the outer pouch 21 is made from a laminate containing an aluminum foil middle layer. A membrane assembly comprised of a membrane 31 and mesh membrane support 32 is attached to the bottom of the outer pouch 21. The membrane assembly optionally also includes a prefilter and prefilter support/spacer (not shown) as described below in FIG. 6. An exit port hole 30 is provided in the outer pouch 21 so that the hot, purified water can be collected. Additionally, an adhesive exit port hole cover 33 with pull tab 34 is provided to keep the membrane clean prior to use and avoid weeping of the membrane during the heating process.

Half-moon shaped cut-outs in the bottom section can be used as generally known to strengthen the gusset heat seal. Construction of stand-up gusseted pouches is also generally well known in the prior art. Common laminates have a polyethylene (PE) inner layer, aluminum (Al) foil middle layer, and a polyethylene terephthalate (PET) outer layer. The PE layer is excellent for heat sealing, the Al foil layer provides good puncture resistance and low gas permeability, and the PET layer is conducive to printing. The Al foil layer eliminates the permeability of water into the pouch and thus improves the shelf life of the reactive chemical formulation.

Insulation 23 can be applied to all or only a section of the outside of the outer pouch 21 to improve the ease of handling and to reduce heat losses to the ambient. Adhesive-backed insulation 23 (with high temperature adhesives, such as acrylic or silicone adhesives) is currently preferred to avoid softening of the adhesive at high temperatures. A temperature indicating device 24, such as a temperature indicating label or other temperature-sensitive device, can also optionally be used to give the user a visual cue of when the water is sufficiently hot (based on palatability or safety thresholds) to begin the filtration step. The filtration process is begun after the outer container 21 is sealed by closing the pouch closure 25. This closure at the top seals the outer pouch to allow pressure to build. The closure mechanism can be a zipper seal, a rod-and-clip seal or the like.

An additional optional heat seal 26 can also be provided along the top of the outer container 21 to improve shelf life by eliminating water vapor intrusion through the closure while the unit is in storage. The above-mentioned tear notch 27 is envisioned to rip off the top heat seal prior to use.

Figure 3A:
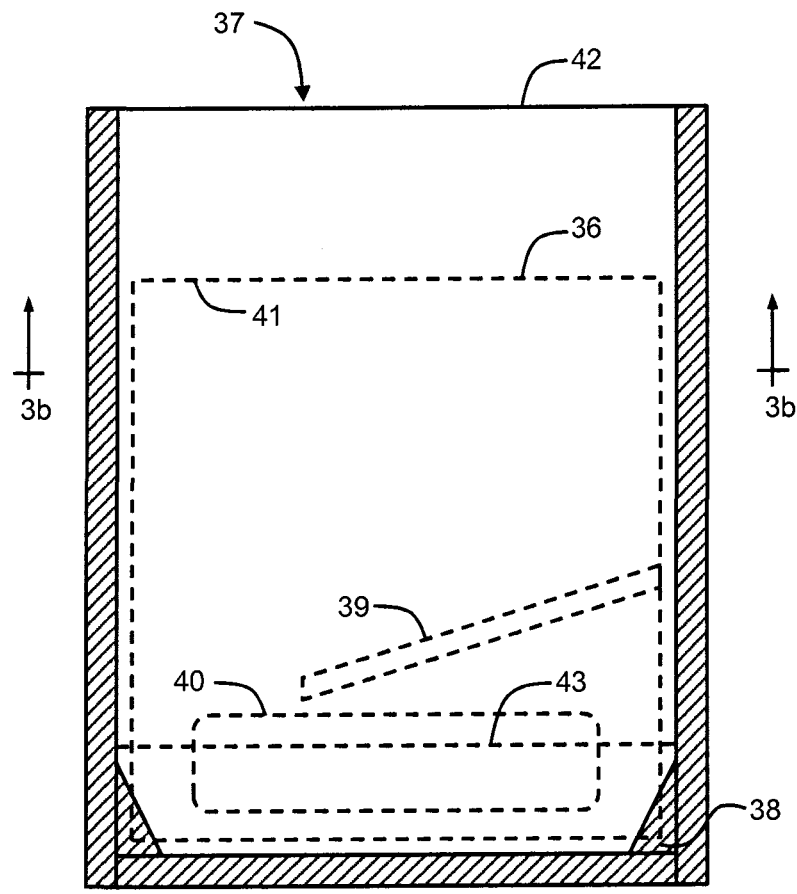
FIG. 3a is a front cross-sectional elevational view showing the interior elements of the flexible pouch embodiment of the present invention.
Figure 3B:
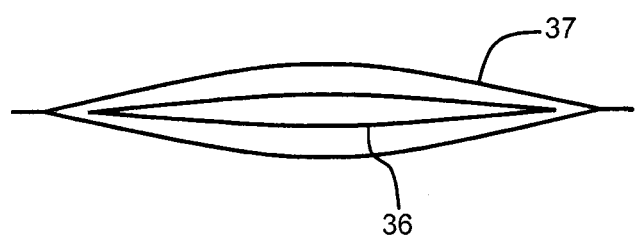
FIG. 3b is a top view showing the arrangement of the inner and outer pouches of the embodiment of FIG. 3a in which a pouch within a pouch configuration is used with the inner pouch tacked in place at the bottom.

The inner pouch can also be arranged inside the outer pouch in one of several ways. FIGS. 3a and 3b show one currently preferred embodiment. In this arrangement, the inner pouch 36 is a complete stand-alone bag that can be optionally tacked in place with a heat seal to the outer pouch 37 in the "shoe" area of the gusset heat seal 38 or can simply be dropped inside the outer pouch 37, either at the time of manufacture or at the time of use. The inner and outer pouches are open along the top edges 41, 42. As previously mentioned, the outer pouch 37 can be can be made to stand up by sealing in a gusset fold 43 in the bottom of the pouch. The inner pouch 36 can be fabricated by folding a rectangular piece of plastic film in half lengthwise and sealing along the sides. Alternatively, the inner pouch can be made from tubular rollstock that is sealed across the bottom.

As a third alternative, the inner pouch can be made from sealing two rectangular pieces of plastic film on three sides. A currently preferred method for sealing the inner and outer pouches is by heat sealing although other equivalent known methods are contemplated. The currently preferred material for the inner pouch is high-density polyethylene (HDPE) although again other known equivalent materials can be substituted. HDPE is a particularly good choice because of compatibility with heat sealing equipment, necessary thermal stability, and strength.

The inner pouch 36 can optionally have a slanted heat seal 39, which holds the reactive chemical formulation in place and prevents the formulation from floating to the top. The downward slant of the heat seal 39 insures that water added to initiate the reaction reaches the formulation. In a currently preferred embodiment, the chemical formulation is a Mg/Fe alloy supercorroding powder that reacts with water and is catalyzed by sodium chloride (NaCl). The Mg/Fe powder and NaCl powder are contained in one or more hydrophilic porous pouches, such as a surfactant-treated spunbond material. These reaction pouches 40 can also be made by heat sealing a folded rectangle of material along three sides.

Figure 4A:
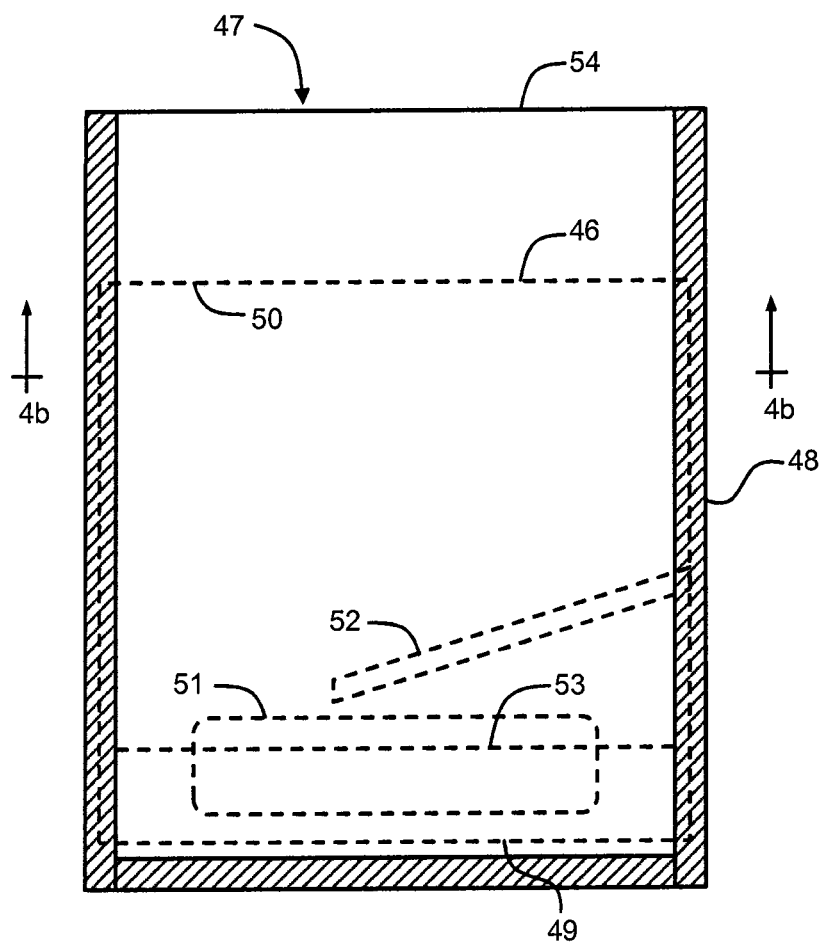
FIG. 4a is a front cross-sectional elevational view showing another embodiment of the interior pouch with a common side seal.
Figure 4B:
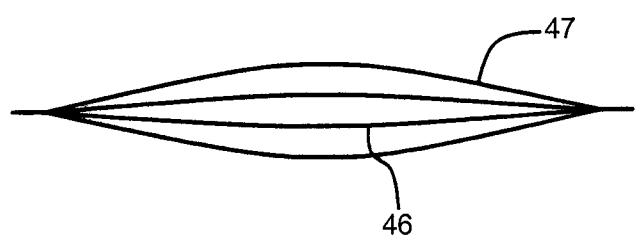

Another embodiment of the inner pouch construction and arrangement is shown in FIGS. 4a and 4b. In this embodiment, the inner pouch 46 is formed by sealing both sides of the inner pouch with the seals of the outer pouch designated generally by numeral 47, that is by sandwiching the sides of the inner pouch 46 in the side heat seals 48 of the outer pouch 47. The bottom edge 49 of the inner pouch 46 is sealed while the top edge 50 is open. The inner pouch 46 contains the reaction pouches 51, which can be held in place by a slanted heat seal 52. The outer pouch 47 can contain a known type of gusset fold 53 to allow the outer pouch to stand up and is open along the top edge 54 to allow the addition of water. Of course one of ordinary skill in the art will understand that other combinations are possible. For example, the inner pouch could be formed by folding the rectangular material of the inner pouch to create a one-sided seal and then sealing the other side by sandwiching only one side into the heat seal 48 of the outer pouch. The purpose of any of these configurations it to create an inner pouch and an outer pouch, where raw water placed into the void between the inner and outer pouch can be heated by the chemical reaction of the inner pouch and receive the gaseous products of the inner pouch.

Different configurations can be created to reduce manufacturing cost, and the specific embodiment selected depends on the quantity of devices to be manufactured. For example, for a small run, it may be more cost effective to purchase a premanufactured commercially available bag for the inner pouch and place it inside a commercially available bag for the outer pouch. This uses more material, but these packages are already manufactured in large quantities. Alternatively, for a large production run, to minimize the use of material, a special flexible packaging machine can be used to manufacture the invention, and in this instance common seals can save sealing time and custom packaging can reduce material costs.

Figure 5A:
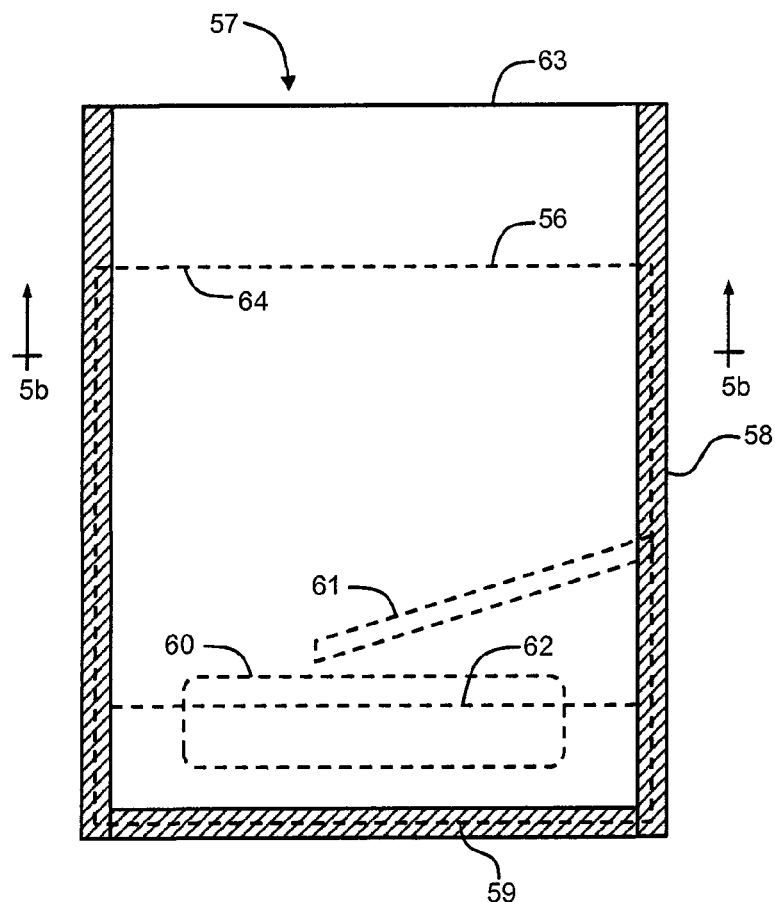
FIG. 5a is a front cross-sectional elevational view showing yet another embodiment of the interior pouch in which a single sheet of plastic film is sandwiched in the side seal to create an inner pocket on one side of the outer pouch.
Figure 5B:
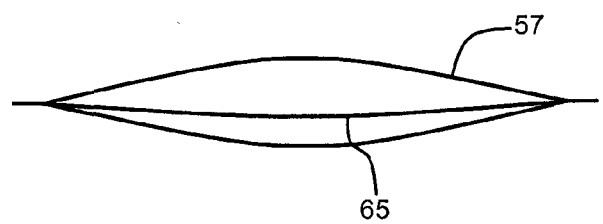

In yet another currently preferred alternative embodiment shown in FIGS. 5a and 5b, the inner pouch 56 is formed by sealing a single rectangular sheet of plastic film 65 in the side and bottom heat seals 58, 59 of the outer pouch 57. This design reduces cost by halving the amount of inner pouch material required, although at the expense of halving the available heat transfer area. Again, the inner pouch 56 contains the reaction pouches 60, which can be held in place by a slanted heat seal 61. The outer pouch 57 again can contain a gusset fold 62 to allow it stand up and is open along the top edge 63 to allow the addition of water. The inner pouch 56 is also open along the top edge 64 to allow gaseous products of the chemical reaction to pressurize the outer pouch 57 when sealed.

FIG. 6 shows one currently contemplated configuration for the membrane assembly 18 as a sandwich of flat sheets of material, which assembly is attached directly to the outer pouch as shown in FIG. 7. The membrane assembly 18 consists of a stack of components 67, 68, 69, 70. Working from the raw water side out, the assembly is optionally configured with a pre-filter 67, an optional pre-filter support and spacer 68 between the pre-filter 67 and the membrane 69 to allow better distribution of water and support the pre-filter, as well as a membrane 69, and a membrane support and spacer 70 to prevent the pressure differential from rupturing the membrane and provide a distribution path for the water to exit through an exit port hole on the bottom of the outer pouch 71. An exit port cover 72 prevents any weeping of water through the membrane assembly during the water heating process. In one currently preferred embodiment, the exit port cover 72 is manufactured from an adhesive-coated non-permeable material; however one skilled in the art can envision the use of other forms of caps or seals.

In one currently preferred embodiment, the membrane material 69 can be an electroadsorptive membrane as described in, for example, U.S. Pat. No. 7,390,343 because of its permeance and ability to remove viruses, bacteria, and cysts. In the embodiment shown in FIGS. 6 and 7, the rectangular membrane sheet 69 is ultrasonically welded along its perimeter 77 to the inside of the bottom of the outer pouch 71. The outer pouch has a hole 78 punched in its center to allow water to exit the device. A plastic mesh spacer or support 70 is provided as shown in FIG. 7 to keep the membrane from rupturing and allow void space for water distribution. The mesh spacer 70 allows water to flow in the interstices of the woven mesh to improve transport on the downstream side of the membrane 69 to the exit hole 78. This arrangement assures that the full membrane area is used. A similar construction can be used for an embodiment in which the optional pre-filter and pre-filter support/spacer layers are employed.

An adhesive film or tape 72 is used to cover the exit port hole 78 when the membrane is not in use. The exit port cover 78 serves two purposes. First, it stops small leaks through the exit port while the raw water is heating as discussed previously. Second, it improves shelf life of the reactive chemical formulation. A circular piece of laminate material is adhered to the adhesive port cover during assembly to further reduce water vapor intrusion and improve shelf life. The adhesive exit port cover can also be provided a pull tab 34 of a generally known type making it easier to remove.

While the foregoing discussion addresses a flat sheet membrane assembly that can be attached to the outer container, other membrane cartridge assemblies are well known to those skilled in the art, and other ways of associating the membrane with the outer pouch (e.g., via a hose connection or other fitting) are also contemplated.

Operation of the flexible pouch embodiment of the SHWP shown in FIG. 2 is as follows. The top heat seal 26 is removed using the tear notch 27 and the pouch closure 25 is opened. Raw, unfiltered water is added to the volume between the inner pouch and outer pouch 21. Current freeze-dried meals use 8 to 16 oz. of water, although other sizes are also contemplated. Water is then added to the inner pouch as above described to initiate the Mg/Fe-water exothermic reaction. After approximately 10 minutes, the raw water 13 in the volume between the inner and outer pouches reaches in excess of 70° C. The heating period can either be specified by time or using a visual cue from the temperature indicating label 24. Next, the adhesive port cover 33 is removed from the bottom. A small amount of water will then begin to flow and flush the membrane assembly 18 similar to the assembly shown in FIG. 1. Next the pouch closure 25 is again sealed and the outer pouch 21 begins to inflate. The SHWP is then held over a collector such as the collector 20 as shown in FIG. 1, in the form, for example, of a freeze-dried food pouch. As the pressure in the outer pouch 21 builds, the flow rate of water through the membrane increases. If the pressure becomes too high, the closure 25 on the outer pouch 21 pops open and releases the pressure. The outer pouch 21 can then be resealed and the filtration process resumed. Typically the filtration process takes 2 to 4 minutes with the electroadsorptive membrane 69 depending on the quality of the raw water.

Figure 8:
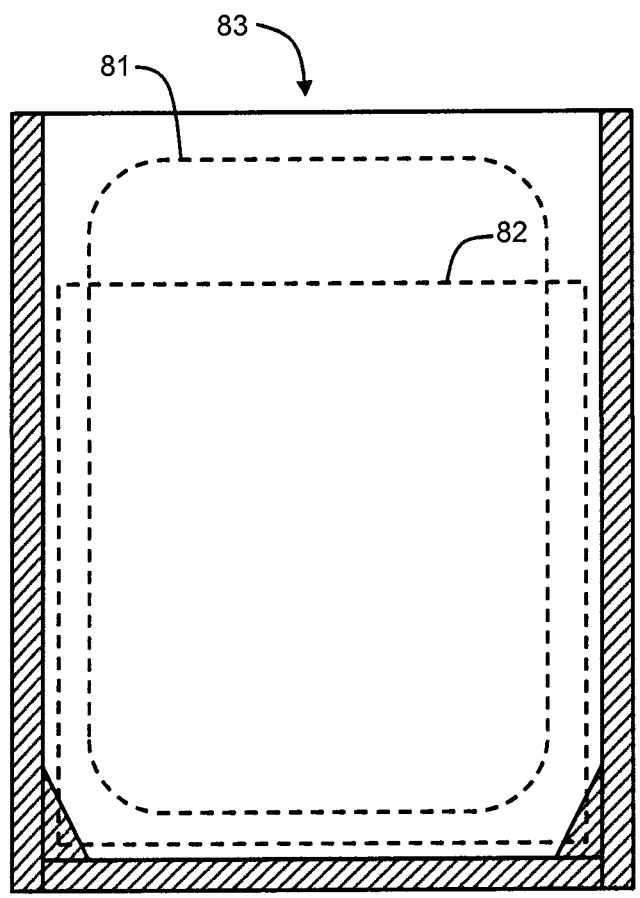

The SHWP of the present invention can also be used in several other ways. For example, a prepared meal 81, such as an MRE, can be placed in with the raw water between the inner pouch 82 and the outer pouch 83 and heated along with the water in order to make a hot prepared meal and also hot water than can be used for making instant coffee and the like, as shown in FIG. 8. The direct contact of the heated raw water with the sealed food package improves the heat transfer and improves the heating rate of the prepared meal package.

Also, the outer container 11 as shown in FIG. 1 can be sealed immediately after the reaction is initiated to purify unheated water in order to provide cool drinking water. Alternatively, activating the heater can be forgone and the outer pouch 21 as shown in FIG. 2 can be rolled up manually to drive the water through the membrane. The SHWP can also be used for heating only in instances where ambient-temperature potable water is available.

Figure 9:
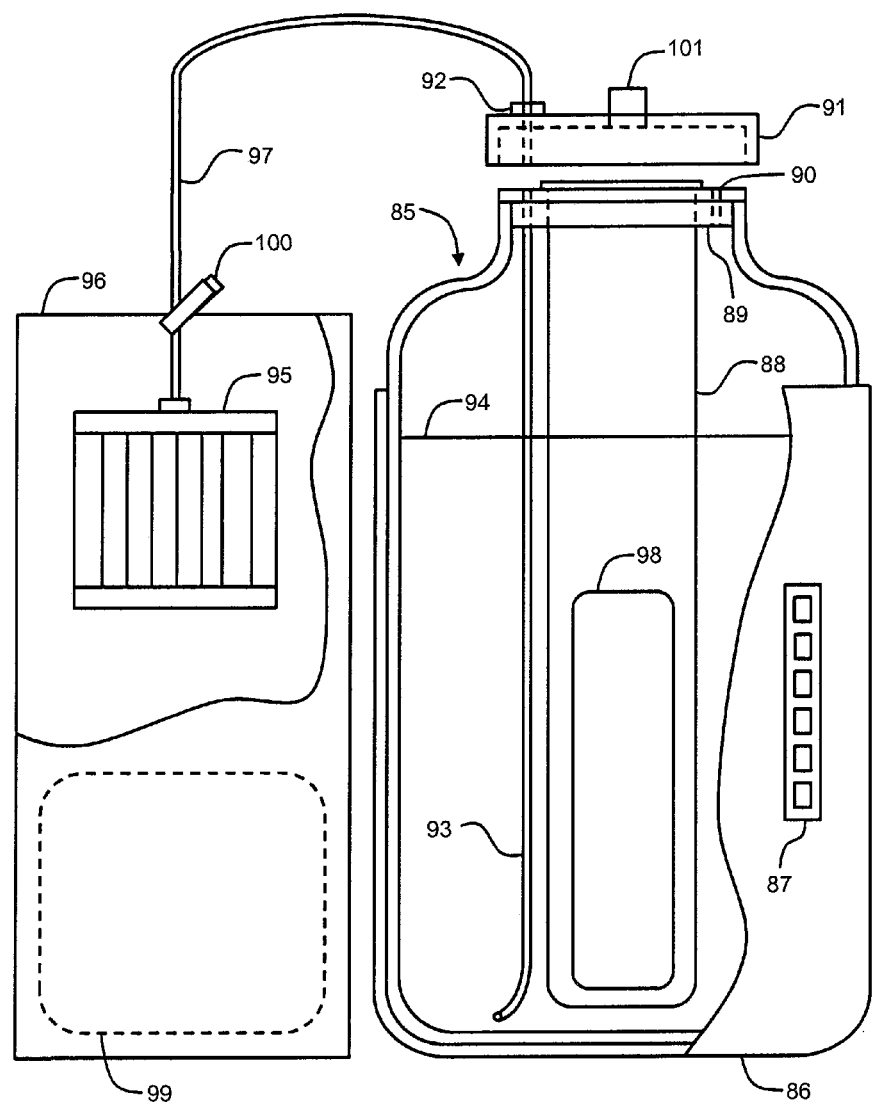
FIG. 9 is a rigid bottle embodiment of the present invention.

FIG. 9 shows an alternative embodiment of the SHWP in the form of a rigid bottle. While the flexible pouch embodiment is envisioned primarily for disposable use, the rigid body embodiment is for reusable application. In this embodiment, the outer container is a rigid bottle 85, such as a polycarbonate bottle or the like. The bottle 85 can be encased in insulation 86, or commercially available neoprene insulating sleeves can be used. The insulation is shown as a cutaway in FIG. 9 to expose the inner bottle components. A temperature indicator 87 can be used on the exterior of the bottle 85 in a similar fashion to the flexible pouch embodiment. For this rigid bottle configuration, the inner container 88 containing the reaction pouches 98 can be a rigid or semi-ridged pouch in addition to a flexible pouch.

FIG. 9 shows a semi-rigid inner pouch 88, similar in construction to disposable baby bottle liners, positioned inside the rigid outer bottle 85. The inner container 88 has a lip at the top which catches on an inner pouch support 89. The inner pouch support 89 can be configured with passages 90 for gaseous products of the chemical reaction to exit the inner pouch 88. Optionally holes (not shown) located in the top region of the inner pouch can be used as a passageway for the gaseous products to travel to the outer pouch. In either configuration, the gaseous products pressurize the outer bottle 85. The outer bottle 85 is sealed with a threaded cap 91. The cap 91 has a port 92 that allows a dip tube 93 to extend to the bottom of the raw, unfiltered water 94 in the volume between the rigid outer bottle 85 and the inner container 88. The dip tube 93 is connected to a membrane cartridge 95.

A membrane cartridge 95 can be placed in a meal pouch 96 (shown cutaway) containing a freeze-dried food or beverage 99 or other collector as shown in FIG. 9. A clip 100 can be used to hold the membrane cartridge 95 above the freeze-dried food or beverage 99. Alternatively the membrane cartridge 95 can be located anywhere along the length of flexible tubing 97. In a currently preferred embodiment, the cartridge 95 is pleated and contains an electroadsorptive membrane although other types of membranes are contemplated.

Pressure build-up is initiated in the bottle 85 by tightening the threaded cap 91 and attaching the membrane cartridge 95 to the water exit port 92 via the flexible tubing 97 and dip tube 93. The water exit port 92 can be sealed by a valve or quick-connect fitting to allow the bottle 85 to carry water without leaking when the SHWP is not in use. The threaded cap 91 can be fitted with a pressure relief valve 101 to insure that the pressure in the bottle 85 does not exceed safe limits. Alternatively, a burst disk can be incorporated into the cap 91, the exit port 92 or the flexible tubing 97. Still another approach is to size or configure the flexible tubing to burst in a controlled fashion.

Operation of the SHWP rigid bottle embodiment is as follows. Raw, unfiltered water 94 is added to the rigid outer bottle 85. The semi-rigid inner pouch 88 and its support 89 are then placed in the bottle 85. Water is then added to the inner pouch to initiate the reaction between water and a Mg/Fe alloy to generate heat and later pressure. The cap 91 is threaded loosely onto the bottle 85 so that a seal is not created. After approximately 10 minutes, the raw water 94 in the volume between the inner pouch 88 and bottle 85 reaches in excess of 70° C. The heating period can either be specified by time or using a visual cue from the reversible temperature indicating label 87. Then, the dip tube 93 is attached to the threaded cap 91 using a quick-connect fitting or similar. Alternatively, the dip tube could be connected before the heating is initiated. Next, the threaded cap 91 is tightened to create a seal and allow the bottle 85 to be pressurized.

Gaseous reaction products pass from the inner pouch 88 through the passages 90 in the inner pouch support 89 and apply pressure to the raw water 94 forcing it through the dip tube 93, flexible tubing 97, and membrane cartridge 95. As the pressure in the bottle 85 builds, the flow rate of water through the membrane cartridge 95 increases. If the pressure becomes too high, the pressure relief valve 101 vents some gases to return the pressure back down to safe levels. The pressure relief valve 101 then reseats and the pressure builds again. Because the available membrane area can be much higher in this rigid bottle embodiment than in the flexible pouch embodiment, the filtration process is very quick. Also, because of the additional membrane filter area, the membrane cartridge 95 can be reused multiple times. Optionally, a chemical disinfectant, such as iodine or chlorine tablets, can also be used in the rigid bottle SHWP embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An apparatus for heating and purifying water, comprising:
    an outer container having an opening for addition of raw water to a predetermined level therein;
    a membrane assembly operatively attached with said outer container;
    a chemical formulation selected to be capable of initiating a chemical reaction to generate heat and gaseous products when mixed with a reaction initiator;
    an inelastic inner container arranged inside the outer container so as to define a volume therebetween in which the raw water is confined, and configured with an opening located above the predetermined level of raw water so as to hold said chemical formulation while preventing the chemical formulation from unintentionally mixing with the raw water confined within the volume and allowing gaseous products generated therein to escape into the outer container through the opening in the inner container, wherein
    the inelastic inner container and the outer container are so configured and arranged to transfer heat from the inelastic inner container to the raw water in the outer container and to allow gaseous products of the reaction to escape the inelastic inner container into the outer container and, wherein
    the outer container has a closure configured to close the opening of the outer container so as to trap gaseous products of the reaction and generate pressure in the outer container to force raw water through the membrane producing hot, purified water.

2. The apparatus of claim 1, wherein said membrane assembly is joined directly to the outer container.

3. The apparatus of claim 2, wherein said membrane assembly is comprised of a flat-sheet membrane and a membrane support.

4. The apparatus of claim 3, wherein said membrane is comprised of a material selected from the group consisting of an electropositive fibrous structure, an electropositive fibrous structure impregnated with activated carbon, polyethersulfone, polycarbonate, and polyvinylidene fluoride.

5. The apparatus of claim 3, wherein said membrane is selected from the group of electroadsorptive filtration membranes, ultrafiltration membranes, nanofiltration membranes, and reverse osmosis membranes.

6. The apparatus of claim 3, wherein said membrane assembly includes a prefilter located upstream of the membrane.

7. The apparatus of claim 1, wherein a flexible tube or other fitting operatively connects said membrane assembly to the outer container.

8. The apparatus of claim 7, wherein said membrane assembly is comprised of a membrane supported in a configuration selected from the group of plate-and-frame, hollow fiber, pleated filter cartridge, and spiral wound.

9. The apparatus of claim 7, wherein said membrane assembly includes a prefilter located upstream of the membrane.

10. The apparatus of claim 7, wherein said membrane is comprised of an electropositive fibrous structure material, electropositive fibrous structure material impregnated with activated carbon, polyethersulfone material, polycarbonate material, or polyvinylidene fluoride material.

11. The apparatus of claim 7, wherein said membrane is one of electroadsorptive filtration membrane, an ultrafiltration membrane, a nanofiltration membrane, and a reverse osmosis membrane.

12. The apparatus of claim 1, wherein the inelastic inner container is a flexible but non-expandable pouch.

13. The apparatus of claim 12, wherein the flexible, non-expandable pouch includes a slanted seal configured to allow a reactant to flow down to the chemical formulation and prevent said chemical formulation from rising in the flexible pouch.

14. The apparatus of claim 1, wherein the inelastic inner container is a semi-rigid liner.

15. The apparatus of claim 1, wherein the outer container is rigid bottle.

16. The apparatus of claim 1, wherein the outer container is a flexible pouch.

17. The apparatus of claim 1, wherein the closure is one of a zipper seal, a rod and clip seal, a threaded cap, and a press fit cap.

18. The apparatus of claim 1, wherein said chemical formulation is arranged so as to be replaceable.

19. The apparatus of claim 1, wherein said chemical formulation is comprised of a magnesium-iron alloy and sodium chloride, such that addition of water initiates the chemical reaction.

20. The apparatus of claim 1, wherein said chemical formulation is contained in a pouch permeable to water and gas located within the inelastic inner container.

21. The apparatus of claim 1, wherein thermal insulation surrounds the outer container.

22. The apparatus of claim 1, further including a temperature indicating label on the outer container.

23. The apparatus of claim 1, wherein reactants in the chemical formulation are separated by a frangible seal configured so that when the seal is broken, the reactants are allowed to mix and initiate the reaction.

24. The apparatus of claim 1, further comprising a water receiving container to collect the heated, purified water and a mechanism to access the heated, purified water once collected.

25. The apparatus of claim 24, further comprising at least one of dehydrated foods, freeze-dried foods and powdered beverages in the water receiving container.

26. An apparatus for heating prepackaged food and providing purified water comprising:
an outer container configured to accept raw water up to a predetermined level therein and the prepackaged food;
a membrane assembly operatively attached with said outer container;
a chemical formulation selected to be capable of initiating a chemical reaction to generate heat and also gaseous products when mixed with a reaction initiator;
an inelastic inner container arranged inside the outer container so as to define a volume therebetween in which the raw water is confined and configured with an opening located above the predetermined level of raw water so as to hold said chemical formulation while preventing the chemical formulation from unintentionally mixing with the contents of the outer container confined within the volume but allowing gaseous products generated therein to escape into the outer container through the opening in the inner container, wherein
the inelastic inner container and the outer container are so configured and arranged to transfer heat from the inelastic inner container to the contents of the outer container and to allow gaseous products of the reaction to escape the inelastic inner container into the outer container and, wherein
the outer container has a closure arranged so that when the opening of the outer container is closed the gaseous reaction products are trapped and pressure is generated in the outer container, whereby the prepackaged food in the outer container is heated and hot, purified water is produced via the membrane.

* * * * *